March 25, 1947.　　O. C. GAINES　　2,418,024
WEEDING IMPLEMENT
Filed Jan. 6, 1945
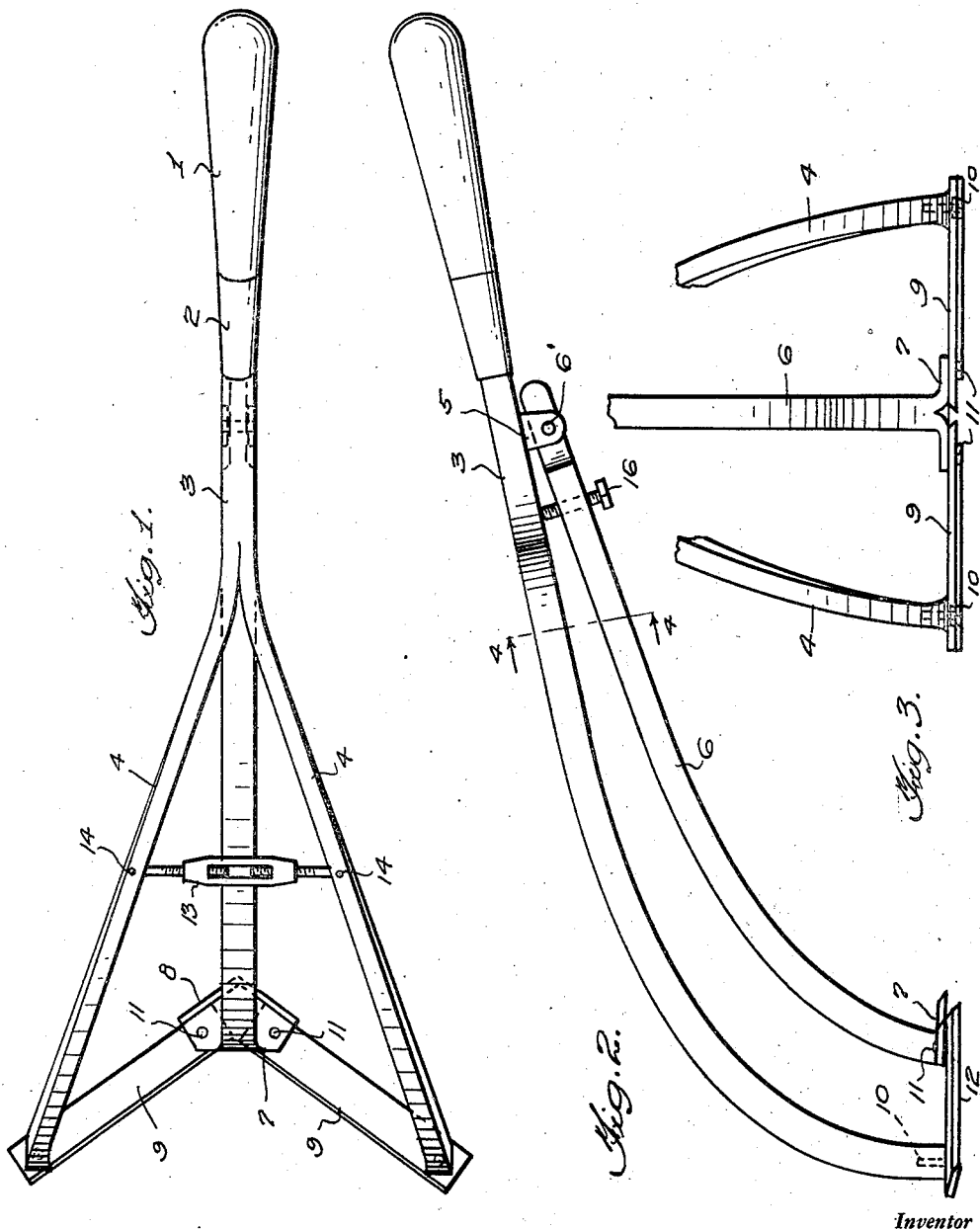
Inventor
ORVILLE C. GAINES,
By Clarence A. O'Brien
and Harvey B. Jacobson
Attorneys Patented Mar. 25, 1947

2,418,024

UNITED STATES PATENT OFFICE 2,418,024

WEEDING IMPLEMENT

Orville C. Gaines, Auburn, Wash.

Application January 6, 1945, Serial No. 571,554

3 Claims. (Cl. 30—299)

My invention relates to improvements in weed-cutting implements, the primary object in view being to provide a simply constructed, inexpensive bladed implement for cutting down weeds with a chopping motion, and which is adapted for easy sharpening, maintaining the blades taut and otherwise maintaining in order, is easier and less tiresome to use than present day similar devices, and is highly efficient in operation.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in plan of my improved weed-cutting implement, in a preferred embodiment thereof, Figure 2 is a view in side elevation, Figure 3 is a view in end elevation, Figure 4 is a view in transverse section taken on the line 4—4 of Figure 2.

Referring to the drawings by numerals, and first to Figures 1 to 4 thereof, my improved weed-cutting implement in the preferred embodiment thereof comprises a short handle 1, preferably tapering in form and to the smaller end of which there is suitably attached by a ferrule 2 a short shank 3 from which a pair of side arms 4 extend in diverging relation and which curve downwardly, gradually, toward what constitutes, in this instance, the rear end of the implement. A pair of ears 5 depend from the bottom side of the shank 3 in laterally spaced relation. A center arm 6, similar to arms 4, is pivoted at its front end, as at 6', between the ears 5 to extend rearwardly in the median plane of the implement downwardly and rearwardly and for vertical swinging adjustment on the pivot 6'. The center arm 6 terminates in front of the arms 4 and in a bridge plate 7 substantially wider than said arm 6 and which is disposed in a plane parallel with the ends of the arms 4 and is provided with a front obtuse angled cutting edge 8. A pair of straight cutting blades 9 are secured at outer ends thereof flat against the ends of said arms 4 by screws 10, the heads of which are countersunk in the bottom of said blades. The inner ends of the blades 9 are similarly secured, as by screws 11, to the bridge plate 7 against the under side thereof and upon opposite sides of the median plane of the implement. The blades 9 are provided with front cutting edges 12. As will be apparent, since the center arm 6 terminates in front of the ends of the side arms 4, the blades 9 converge forwardly and the obtuse angled cutting edge 8 of the bridge plate 7 forms a bridging cutting edge over the inner ends of the blades 9 substantially parallel with the cutting edges 12 of said blades. In connection with the blades 9 and bridge plate 7, and as best shown in Figures 2 and 3, said blades and plate incline forwardly and downwardly of the ends of the arms 4 and center arm 6 for better cutting close to the ground. The screws 10 and 11, when loosened, form pivots and the arms 4 are sufficiently resilient to permit adjustment of the same toward and from each other, respectively, whereby the angular relation of the blades 9 may be varied to obtain more or less of a draw cut therewith. A turnbuckle 13 is suitably pivoted, as at 14, at its opposite ends to the arms 4 for adjusting said arms toward or from each other. A set screw 16 is provided in the center arm 6 adjacent the pivot 6' to bear upwardly against the shank 3 and whereby the center arm 6 may be adjusted downwardly on said pivot 6' to vary the plane in which the blades 12 and bridge plate 7 will cut. By spreading the arms 4 apart, through the turnbuckle 13, and adjusting the center arm 6 downwardly, the blades 9 may always be maintained taut.

The described implement is used to chop down weeds with a hoeing action, in which the blades 9 and also the cutting edge 8 of the bridge plate 7 effect a draw cut which effect may be varied by varying the angular relation of the blades 9 in the manner already described. By virtue of the forward and downward inclination of the blades 9 and bridge plate 7, relative to the ends of the arms 4 and 6, weeds may be cut readily and cleanly close to the ground. To prevent weeds and the like from clogging the inner ends of the blades 9, the bridge plate 7 is extended forwardly of the cutting edges 12 of said blades.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A weed-cutting implement comprising a handle, a shank at one end of the handle, a pair of flexible side arms diverging relatively from said shank and curving downwardly relative thereto, a similar shorter center arm below said side arms attached to said shank and having one end terminating short of the ends of the side arms, a pair of cutting blades having outer ends connected to the ends of the side arms and inner ends connected to said end of the center arm whereby said blades converge toward said center arm, said connections comprising pivots whereby the angular relation of said blades may be varied by flexing of said side arms, and a turnbuckle extending between said side arms for flexing the same.

2. A weed-cutting implement comprising a handle, a shank at one end of the handle, a pair of flexible side arms diverging relatively from said shank and curving downwardly relative thereto, a similar shorter center arm below said side arms attached to said shank and having one end terminating short of the ends of the side arms, a pair of cutting blades having outer ends connected to the ends of the side arms and inner ends connected to said end of the center arm whereby said blades converge toward said center arm, said connections comprising pivots whereby the angular relation of said blades may be varied by flexing of said side arms, and a turnbuckle extending between said side arms for flexing the same, said end of said center arm terminating in a plate bridging the inner ends of said blades and provided with a cutting edge.

3. A weed-cutting implement comprising a handle, a shank at one end of the handle, a pair of flexible side arms diverging relatively from said shank and curving downwardly relative thereto, a similar shorter center arm below said side arms attached to said shank and having one end terminating short of the ends of the side arms, a pair of cutting blades having outer ends connected to the ends of the side arms and inner ends connected to said end of the center arm whereby said blades converge toward said center arm, said connections comprising pivots whereby the angular relation of said blades may be varied by flexing of said side arms, and a turnbuckle extending between said side arms for flexing the same, said center arm being adjustable on said shank to vary the position of said blades laterally.

ORVILLE C. GAINES.

REFERENCES CITED

The following references are of record in the file of this patent:

UNITED STATES PATENTS

| Number | Name | Date |
|---|---|---|
| 1,785,443 | Fisher | Dec. 16, 1930 |
| 1,800,905 | Rieff | Apr. 14, 1931 |
| 2,134,070 | Avant | Oct. 25, 1938 |
| 1,595,584 | Stump | Aug. 10, 1926 |
| 2,106,047 | Birge | Jan. 18, 1938 |
| 2,378,657 | Reinke | June 19, 1945 |
| 1,070,766 | Braun | Aug. 19, 1913 |